No. 712,033. Patented Oct. 28, 1902.
H. BARNARD.
WHEEL TIRE.
Application filed Apr. 21, 1902.)
(No Model.)
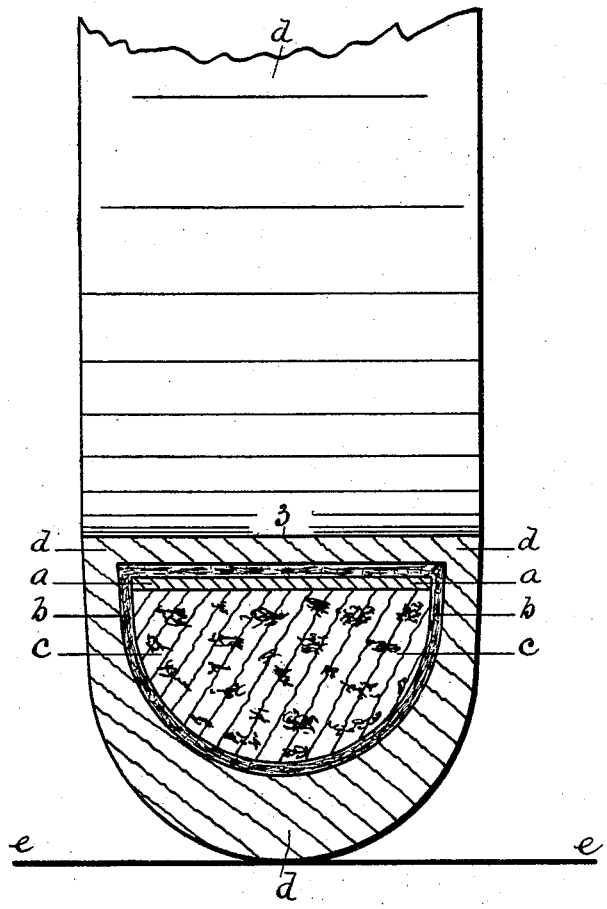
Witnesses. Inventor.

UNITED STATES PATENT OFFICE.

HARRY BARNARD, OF HAMILTON, CANADA.

WHEEL-TIRE.

SPECIFICATION forming part of Letters Patent No. 712,033, dated October 28, 1902.

Application filed April 21, 1902. Serial No. 103,886. (No model.)

*To all whom it may concern:*

Be it known that I, HARRY BARNARD, a citizen of Canada, residing at Hamilton, in the county of Wentworth and Province of Ontario, Canada, have invented new and useful Improvements in Wheel-Tires; and I do hereby declare the following to be a full, clear, and exact description of the same.

My invention relates to improvements in wheel-tires in which a continuous metal band is inside a continuous fabric covering and surmounted by a filling of cork as a core and the whole covered with a rubber covering vulcanized to the same, as shown.

The objects of my invention are, first, to provide a wheel-tire which shall be substantial and durable to suit all manner of vehicles; second, to provide a tire to contain and to retain a band or a channel-band to strengthen the tire transversely and lengthwise and to prevent stretching or creeping of the material which goes to make up the tire. I attain these objects by the device illustrated in the accompanying drawing, which is a sectional elevation of a wheel-tire, showing the continuous metal band in defined and proper position in the tire and the outer circle part of the tire engaged with a ground-line.

In the drawing the continuous metal band is indicated by $a$, the fabric covering by $b$, the core by $c$, and the outer covering by $d$. These several parts as respectively indicated by $a$, $b$, $c$, and $d$ are substantially and firmly vulcanized together to form a durable tire, having a flat base for seating in the wheel-felly. The ground-line is indicated by $e$. The metal band $a$ runs continuous with the tire. The tire is made in a straight strip or a continuous circle, the ends of the straight one being suitably fastened together on the wheel.

It will be obvious that the metal band $a$ is positioned as near to the wheel-rim line 3 as possible in order to give strength to the part of the tire which fastens to the rim of a wheel, also to allow elasticity to the part of the tire which engages the ground.

What I claim as my invention, and desire to secure by Letters Patent, is—

A wheel-tire having a flat base and consisting of an outer rubber covering, an inner fabric covering, a metal band inside the fabric covering and above and close to the flat base, and a cork core inside the fabric covering and surmounting the metal band, all of said parts being vulcanized together for the purposes specified.

In testimony whereof I affix my signature in presence of two witnesses.

HARRY BARNARD.

Witnesses:
   JOHN H. HENDRY,
   JOHN G. GAULD.